United States Patent [19]
Wu

[11] Patent Number: 6,126,182
[45] Date of Patent: Oct. 3, 2000

[54] WHEEL HOLDER ASSEMBLY AND MAIN SHAFT ARRANGEMENT OF A GOLF CART

[76] Inventor: David Wu, No. 35-1, Jih Hsin Street, Tu Cheng Hsiang, Taipei Hsien, Taiwan

[21] Appl. No.: 09/136,063

[22] Filed: Aug. 19, 1998

[51] Int. Cl.$^7$ .................................................. B62B 3/02
[52] U.S. Cl. ................................ 280/47.26; 280/DIG. 6; 280/47.2; 280/646; 280/655
[58] Field of Search ......................... 280/47.26, DIG. 6, 280/47.2, 38, 40, 42, 645, 646, 652, 655

[56] References Cited

U.S. PATENT DOCUMENTS

| | | | |
|---|---|---|---|
| 2,414,017 | 1/1947 | Carr et al. | 280/DIG. 6 |
| 2,806,709 | 9/1957 | Watson | 280/38 |
| 2,914,336 | 11/1959 | Hibben, Jr. et al. | 280/DIG. 6 |
| 2,989,319 | 6/1961 | Northrop | 280/47.26 |
| 5,451,072 | 9/1995 | Weng | 280/DIG. 6 |
| 5,586,778 | 12/1996 | Lindh et al. | 280/DIG. 6 |

*Primary Examiner*—J. J. Swann
*Assistant Examiner*—James S. McClellan
*Attorney, Agent, or Firm*—Dougherty & Troxell

[57] ABSTRACT

A wheel holder assembly and main shaft arrangement includes a main shaft made of a triangular section bar and having an upper bag cradle and a lower bag cradle for holding a golf bag, and a wheel holder assembly mounted on the main shaft to hold a pair of wheels, the wheel holder assembly including a mounting frame fastened to the main shaft, two wheel frames each holding a wheel, two pairs of legs respectively coupled between the mounting frame and the wheel frames at two opposite sides of the main shaft, and two links respectively pivotably connected between the legs and the upper bag cradle, the mounting frame having a hollow frame base with a triangular inner diameter sleeved onto the main shaft and fixedly secured thereto by fastening means and two substantially U-shaped coupling plates integral with the hollow frame base at two opposite sides, the main shaft having a first sloping side wall and a second sloping side wall joined at the top and a bottom side wall connected between the first sloping side wall and the second sloping side wall at the bottom; the U-shaped coupling plates of the mounting frame each having two parallel walls closely attached to the top ends of the legs at top and bottom sides and respectively supported on the sloping side walls of the main shaft.

1 Claim, 6 Drawing Sheets

WHEEL HOLDER ASSEMBLY AND MAIN SHAFT ARRANGEMENT OF A GOLF CART

BACKGROUND AND SUMMARY OF THE INVENTION

The present invention relates to a golf cart, and more particularly to the wheel holder assembly and main shaft arrangement of a golf cart which has a strong structural strength for bearing a heavy load.

FIGS. 1 and 2 illustrate the frame structure of golf cart according to the prior art. This frame structure comprises a main shaft, an upper bag cradle and a lower bag cradle fixedly fastened to the main shaft near its two opposite ends, a wheel holder mounting frame fixedly fastened to the main shaft between the bag cradles, two wheel frames each holding a wheel (not shown), a handle coupled to the front end of the main shaft, two pairs of legs respectively pivotably connected between the wheel holder mounting frame and the wheel frames by respective pivot bolts, and two links respectively pivotably coupled between legs and the upper bag cradle. FIGS. 3 and 4 illustrate another golf cart frame structure according to the prior art. This frame structure comprises a main shaft holding an upper bag cradle (not shown) and a lower bag cradle, a wheel holder mounting frame fixedly fastened to the main shaft between the upper bag cradle and the lower bag cradle, two wheel frames each holding a wheel (not shown), two pairs of legs respectively pivotably connected between the wheel holder mounting frame and the wheel frames at two opposite sides of the main shaft, and two links respectively pivotably coupled between legs and the upper bag cradle. According to the aforesaid two golf cart frame structures, the connections between the mounting frames and the legs are spaced from the main shaft at a distance. When the golf cart is extended out to carry a heavy load, the connections between the mounting frames and the legs are suspended from the main shaft but not supported thereon, therefore the connections tend to be forced to vibrate or to deform.

The present invention has been accomplished to provide a wheel holder assembly and main shaft arrangement for a golf cart which eliminates the aforesaid problem. According to the present invention, the wheel holder assembly and main shaft arrangement comprises a main shaft, and a wheel holder assembly mounted on the main shaft. The wheel holder assembly comprises a mounting frame fastened to the main shaft, two wheel frames each holding a wheel, two pairs of legs respectively coupled between the mounting frame and the wheel frames at two opposite sides of the main shaft, and two links respectively pivotably connected between the legs and an upper bag cradle at the main shaft. The mounting frame comprises a hollow frame base with a triangular inner diameter sleeved onto the main shaft and fixedly secured thereto by fastening means, and two substantially U-shaped coupling plates integral with the hollow frame base at two opposite sides. The main shaft has first sloping side wall and a second sloping side wall joined at the top, and a bottom side wall connected between the first sloping side wall and second sloping side wall at the bottom. The U-shaped coupling plates of the mounting frame each have two parallel walls closely attached to the top ends of the legs at top and bottom sides and respectively supported on the sloping side walls of the main shaft. The top ends of the legs are respectively coupled to the U-shaped coupling plates of the mounting frame above the sloping side walls of the main shaft. Because the connections between the mounting frame and legs are supported on the sloping side walls of the main shaft, the wheel holder assembly and main shaft arrangement is strong enough to bear a heavy load.

DETAILED DESCRIPTION OF THE PREFERRED EMBODIMENT

Figure 1:
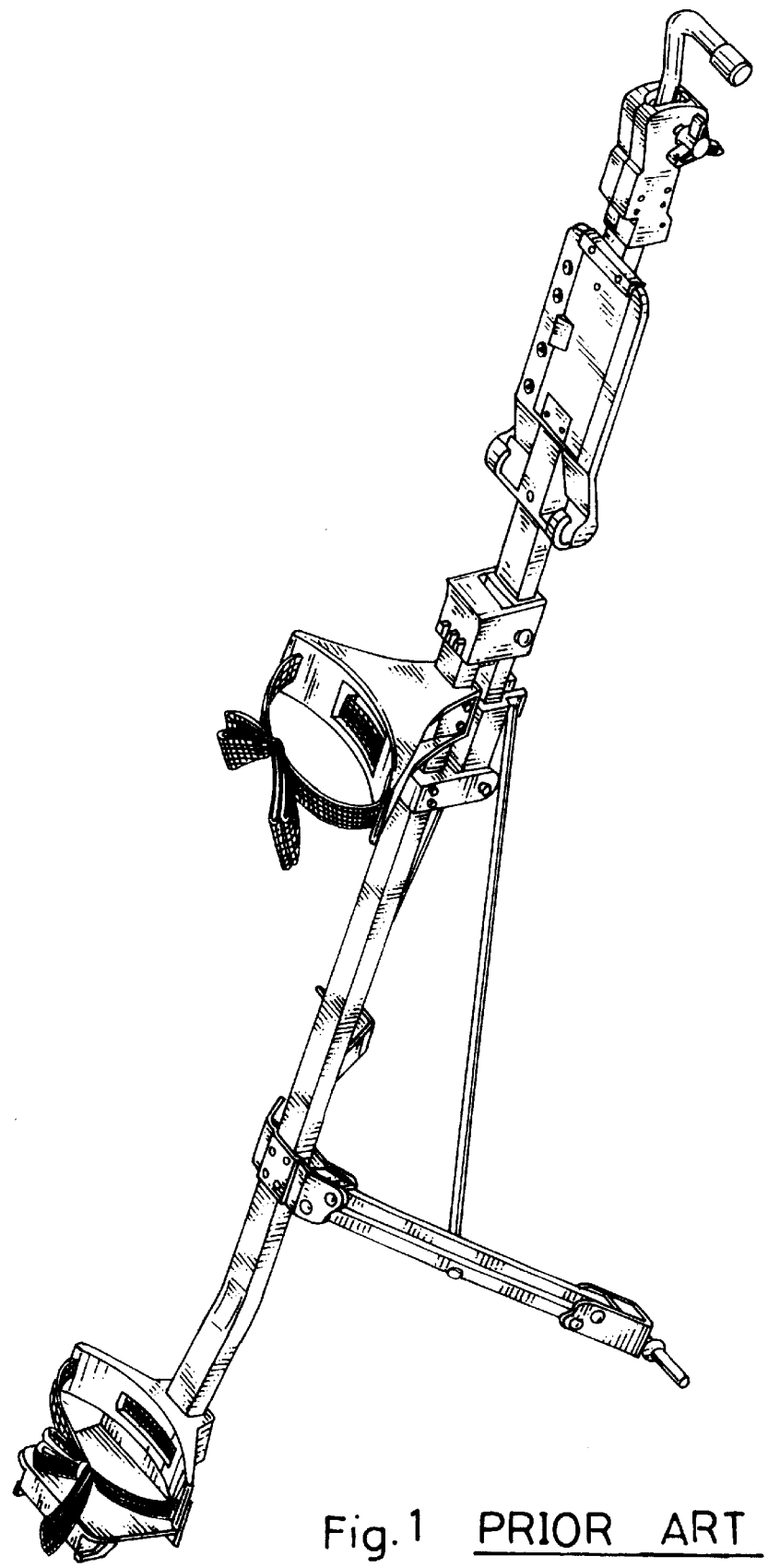
FIG. 1 illustrates a wheel holder assembly and main shaft arrangement for a golf cart according to the prior art.
Figure 2:
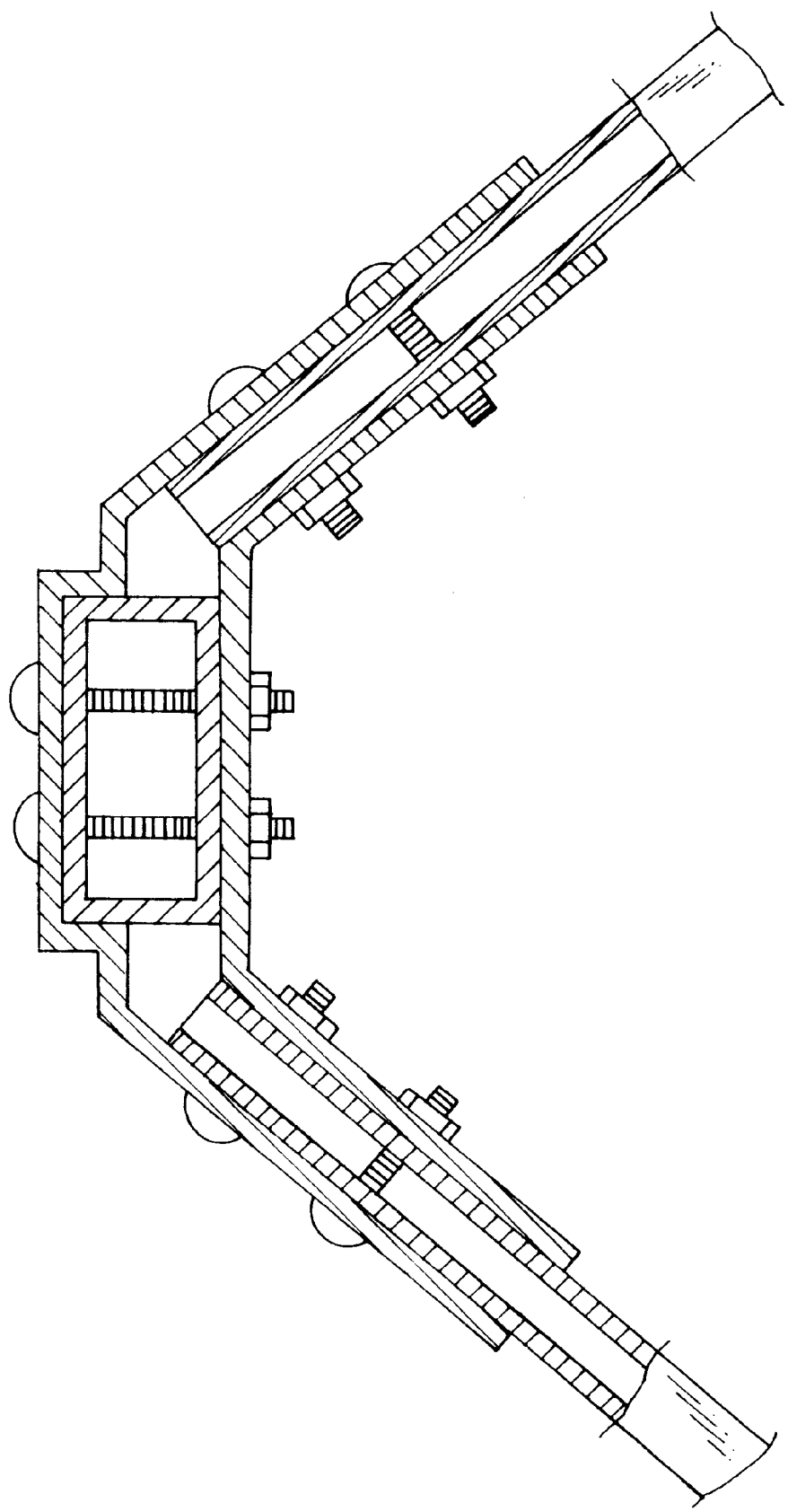
FIG. 2 is a sectional view in an enlarged scale of a part of FIG. 1 showing the mounting frame of the wheel holder assembly fastened to the main shaft.
Figure 3:
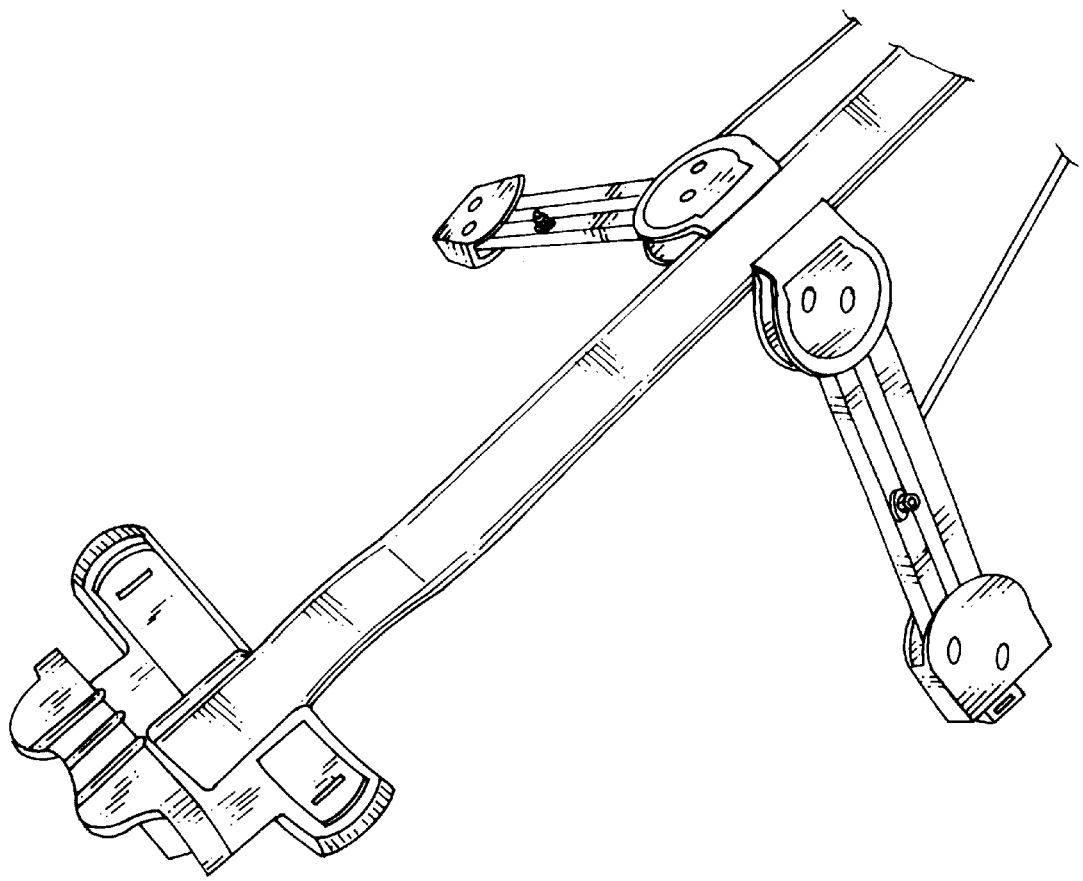
FIG. 3 illustrates another wheel holder assembly and main shaft arrangement for a golf cart according to the prior art.
Figure 4:
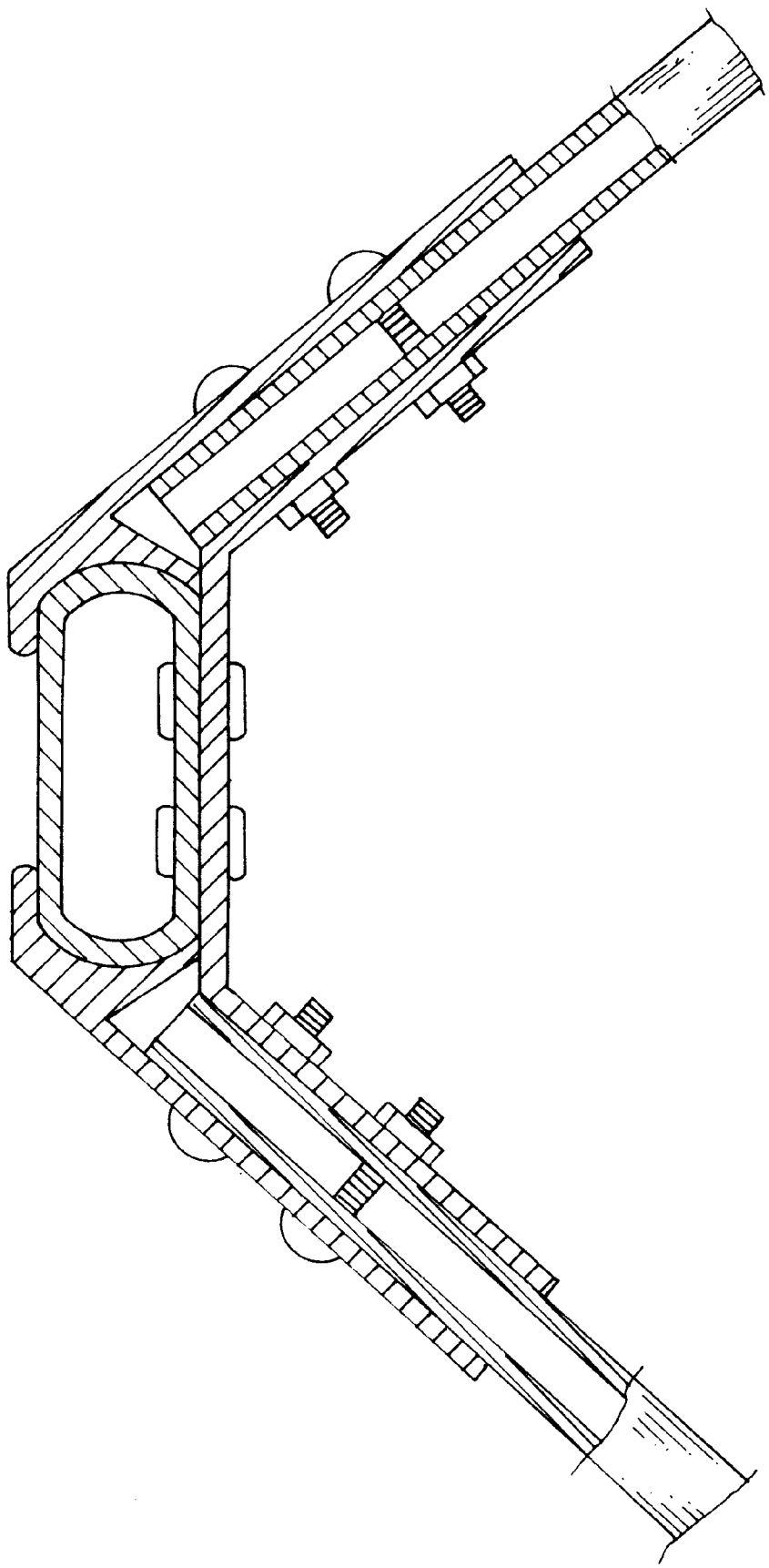
FIG. 4 is a sectional view in an enlarged scale of a part of FIG. 3, showing the mounting frame of the wheel holder assembly fastened to the main shaft.
Figure 5:
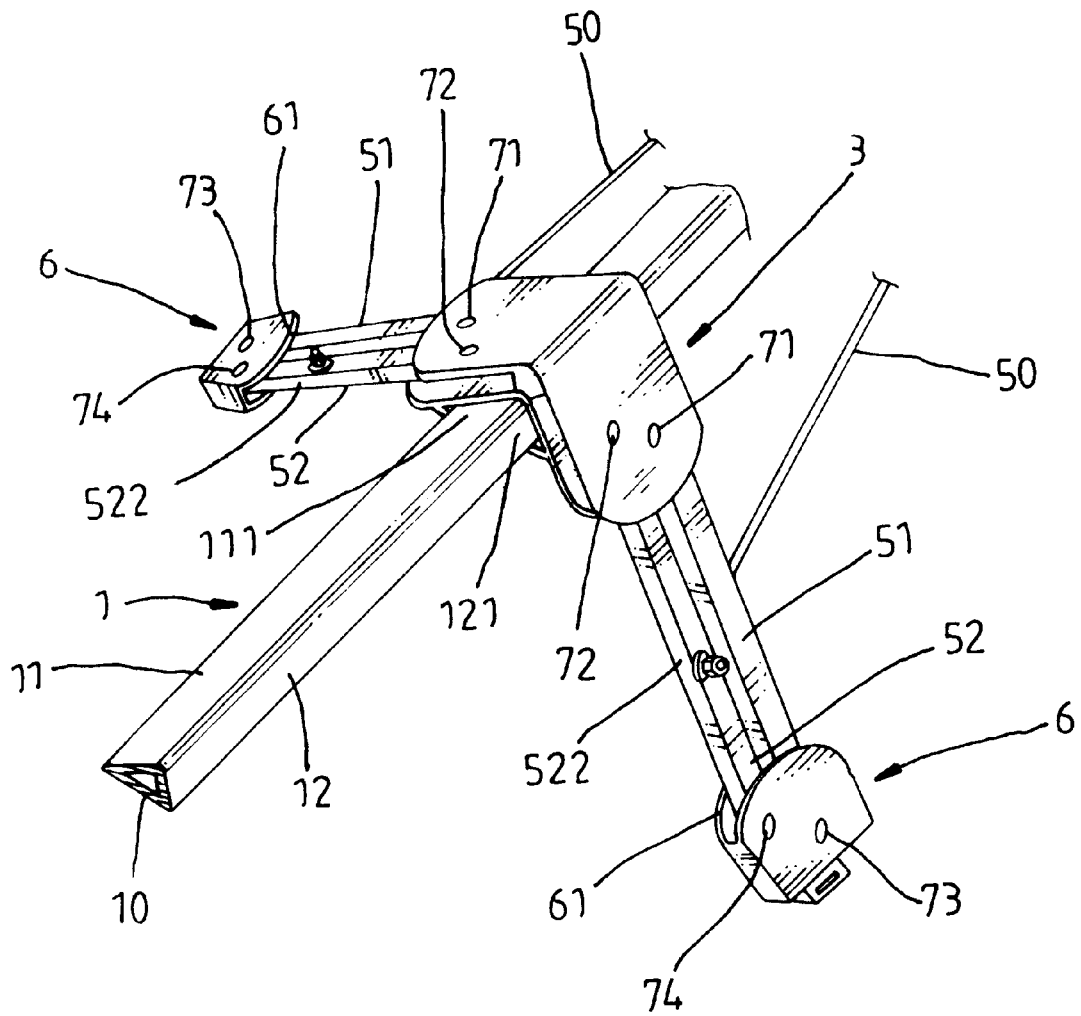
FIG. 5 illustrates a wheel holder assembly and main shaft arrangement for a golf cart according to the present invention.
Figure 6:
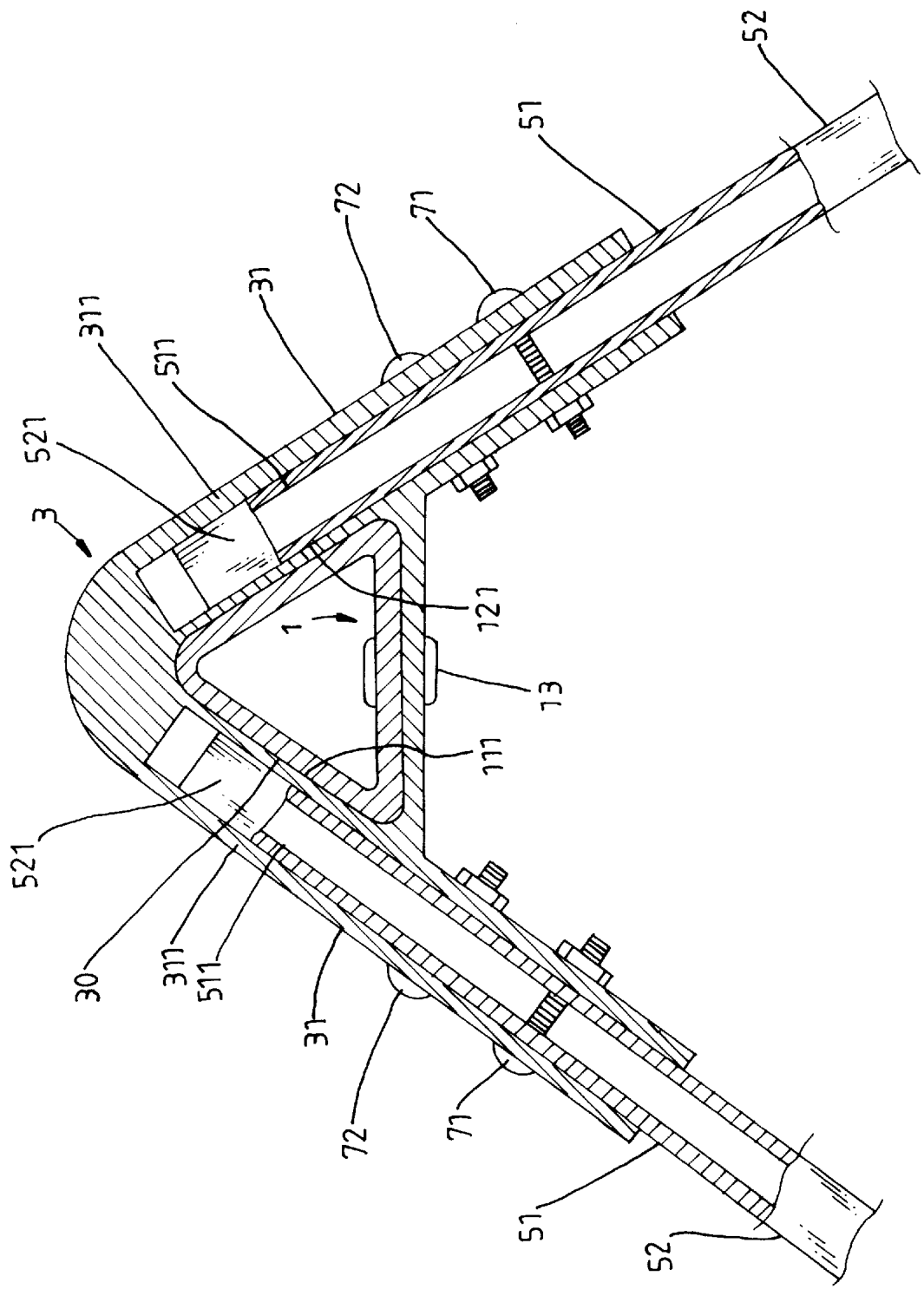
FIG. 6 is a sectional view in an enlarged scale of a part of FIG. 5, showing the mounting frame of the wheel holder assembly fastened to the main shaft.

Referring to FIGS. 5 and 6, a wheel holder assembly is fixedly fastened to the main shaft 1 of a golf cart (not shown) to hold a pair of wheels (not shown). The main shaft 1 is fixedly mounted with an upper bag cradle (not shown) and a lower bag cradle (not shown) for carrying a golf bag. The wheel holder assembly is generally comprised of a mounting frame 3 fastened to the main shaft 1, two wheel frames 6, which hold a wheel (not shown) each, two pairs of legs 51, 52 respectively coupled between the mounting frame 3 and the wheel frames 6 at two opposite sides of the main shaft 1, and two links 50 respectively pivotably connected between the legs 52 and the upper bag cradle.

The mounting frame 3 comprises a hollow frame base 30 sleeved onto the main shaft 1 and fixedly secured thereto by fastening means 13, and two substantially U-shaped coupling plates 31 integral with the hollow frame base 30 at two opposite sides. The top ends 511, 521 of the legs 51, 52 are respectively inserted into the U-shaped coupling plates 31 and connected thereto by pivot bolts 71, 72. The wheel frames 6 each have a substantially U-shaped base 61 respectively pivotably connected to the bottom ends of the legs 51, 52 by pivot bolts 73, 74. The links 50 each have a bottom end respectively pivoted to middle sections 522 of the legs 52, and a top end respectively pivoted to the upper bag cradle.

Referring to FIGS. 5 and 6 again, the hollow frame base 30 of the mounting frame 3 is shaped like a triangular barrel, and the main shaft 1 is a triangular section bar fitting the inner diameter of the hollow frame base 30. The main shaft 1 comprises a first sloping side wall 11 and a second sloping side wall 12 joined at the top and a bottom side wall 10 connected between the sloping side walls 11, 12 at the bottom. The U-shaped coupling plates 31 of the mounting frame 3 are respectively supported on portions 111, 121 of the sloping side walls 11, 12 of the main shaft 1, each having two parallel walls 311 closely attached to the top ends 511, 521 of the legs 51, 52 at top and bottom sides in parallel to the corresponding sloping side wall 11, 12 of the main shaft. When the legs 51, 52 are extended out to hold the golf cart is set in the operative position, the top ends 511, 521 of the legs 51, 52 are firmly retained in the U-shaped coupling plates 31 of the mounting frame 3 and supported above the sloping side walls 11, 12 of the main shaft 1, thus the golf cart can be stably moved on the ground.

The aforesaid arrangement enables the golf cart to carry a heavy load, and prolongs the service life of the golf cart.

What is claimed is:

1. A wheel holder assembly and main shaft arrangement comprising a main shaft having an upper bag cradle and a lower bag cradle for holding a golf bag, and a wheel holder assembly mounted on said main shaft to hold a pair of wheels, said wheel holder assembly comprising a mounting frame fastened to said main shaft, two wheel frames, each of said two wheel frames hold a wheel, two pairs of legs respectively coupled between said mounting frame and said wheel frames at two opposite sides of said main shaft, and two links respectively pivotably connected between said legs and said upper bag cradle, said mounting frame comprising a hollow frame base sleeved onto said main shaft and fixedly secured thereto by fastening means and two substantially U-shaped coupling plates integral with said hollow frame base at two opposite sides, said legs each having a top end respectively pivoted to said U-shaped coupling plates by pivot means and a bottom end respectively pivoted to said wheel frames by pivot means, wherein said hollow frame base of said mounting frame is triangular in shape having a triangular inner diameter; said main shaft is made of a triangular section bar fitting the triangular inner diameter of said hollow frame base, having a first sloping side wall and a second sloping side wall joined at the top and a bottom side wall connected between said first sloping side wall and said second sloping side wall at the bottom; said U-shaped coupling plates of said mounting frame are respectively supported on the sloping side walls of said main shaft, each having two parallel walls closely attached to the top ends of said legs at top and bottom sides in parallel to the corresponding sloping side wall of said main shaft.

* * * * *